United States Patent
Kameyama et al.

(10) Patent No.: US 6,795,139 B1
(45) Date of Patent: Sep. 21, 2004

(54) POLARIZING ELEMENT, OPTICAL ELEMENT, POLARIZED LIGHT SUPPLY UNIT AND LIQUID-CRYSTAL DISPLAY DEVICE

(75) Inventors: Tadayuki Kameyama, Osaka (JP); Hironori Motomura, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/571,862

(22) Filed: May 16, 2000

(30) Foreign Application Priority Data

May 17, 1999 (JP) ............................ P. 11-135333

(51) Int. Cl.$^7$ ............................ G02F 1/1335
(52) U.S. Cl. ............................ 349/96; 349/97; 349/98
(58) Field of Search ............................ 349/96, 97, 98; 428/480

(56) References Cited

U.S. PATENT DOCUMENTS

| | | |
|---|---|---|
| 5,835,166 A | 11/1998 | Hall et al. |
| 6,377,325 B2 * | 4/2002 | Faris et al. ............. 349/98 |
| 6,404,464 B1 * | 6/2002 | Faris et al. ............. 349/15 |
| 6,531,230 B1 * | 3/2003 | Weber et al. ............. 428/480 |

FOREIGN PATENT DOCUMENTS

| | | | |
|---|---|---|---|
| EP | 0 908 745 A1 | 4/1999 | |
| JP | 4-268505 | 9/1992 | ............. G02B/5/30 |
| WO | 95/17691 | 6/1995 | ............. G02B/5/30 |
| WO | WO 97/01780 A1 | 1/1997 | |

\* cited by examiner

Primary Examiner—Kenneth Parker
Assistant Examiner—David Y. Chung
(74) Attorney, Agent, or Firm—Sughrue Mion, PLLC

(57) ABSTRACT

A liquid-crystal display device having a polarizing element, an optical element, a polarized light supply unit, and liquid-crystal cells. The polarizing element has a function of separating natural light into reflected or transmitted light composed of polarized light, wherein a half-reflecting wavelength in each position in a surface of the polarizing element ranges within ±10 nm relative to a half-reflecting average wavelength when the half-reflecting wavelength is a wavelength which is located at a long or short wave side of a wavelength exhibiting maximum reflectivity on the basis of a spectrum of reflected light in a predetermined wave range in which the natural light is separated into the reflected light and the transmitted light, and which exhibits reflectivity of 50% with respect to the maximum reflectivity, and the half-reflecting average wavelength is an average of half-reflecting wavelengths in the surface. The optical element has a laminate of the polarizing element and an absorption type polarizing plate. The polarized light supply unit has a surface light source provided with a reflection layer, and either one of the polarizing element and the optical element disposed above the surface light source. The liquid-crystal cells are disposed on the light output side of the polarized light supply unit.

15 Claims, 1 Drawing Sheet

POLARIZING ELEMENT, OPTICAL ELEMENT, POLARIZED LIGHT SUPPLY UNIT AND LIQUID-CRYSTAL DISPLAY DEVICE

BACKGROUND OF THE INVENTION

1. Field of the Invention

The present invention relates to a polarizing element adapted for improvement in brightness, suppression of display blur, etc. in a liquid-crystal display device, and an optical element and a polarized light supply unit using such a polarizing element.

The present application is based on Japanese Patent Application No. Hei. 11-135333, which is incorporated herein by reference.

2. Description of the Related Art

An element constituted by a laminate of cholesteric liquid-crystal layers and a quarter-wavelength plate or an element constituted by a birefringent multilayer film is heretofore known as a polarizing element which can improve brightness of a liquid-crystal display device by overcoming such a disadvantage of the absorption type polarizing plate that about an half of incident light is absorbed as a loss (Japanese Patent Publication No. Hei. 4-268505 and PCT No. 95/17691).

The aforementioned element was designed so that linearly polarized light was made incident on an absorption type polarizing plate under coincidence of axes of polarization to hereby prevent the absorption loss. There was, however, a problem that visual recognition property was lowered largely like the case of a prism array layer because remarkable display blur occurred when a liquid-crystal display device using the aforementioned element was viewed obliquely. Incidentally, in the prism array layer for achieving improvement of brightness by light path control, visual recognition property was lowered greatly at an obliquely viewing angle not smaller than about 40 degrees because of lowering of brightness.

SUMMARY OF THE INVENTION

An object of the present invention is to develop a polarizing element, an optical element and a polarized light supply unit, which can generate polarized light low in absorption loss due to an absorption type polarizing plate, which can supply incident light to liquid-crystal cells with good light utilizing efficiency and which can form a liquid-crystal display device excellent in brightness and little in display blur.

According to an aspect of the present invention, there is provided a polarizing element having a function of separating natural light into reflected or transmitted light composed of polarized light, wherein a half-reflecting wavelength in each position in a surface of the polarizing element ranges within ±10 nm relative to a half-reflecting average wavelength. Hereupon, the half-reflecting wavelength is a wavelength which is located at a long or short wave side of a wavelength exhibiting maximum reflectivity on the basis of a spectrum of reflected light in a predetermined wave range in which the natural light is separated into the reflected light and the transmitted light. And the half-reflecting wavelength exhibits reflectivity of 50% with respect to the maximum reflectivity. The half-reflecting average wavelength is an average of half-reflecting wavelengths in the whole surface of the polarizing element.

The present invention further provides: an optical element including the aforementioned polarizing element, and an absorption type polarizing plate laminated on the polarizing element through an adhesive layer; a polarized light supply unit including a surface light source provided with a reflection layer, and the aforementioned polarizing element or optical element disposed above the surface light source; and a liquid-crystal display device including the polarized light supply unit, and liquid-crystal cells disposed on the light output side of the polarized light supply unit through an absorption type polarizing plate.

According to the present invention, there can be formed a liquid-crystal display device which is so excellent in a polarized light separating function that polarized light low in absorption loss due to an absorption type polarizing plate is provided with good incident light utilizing efficiency and which is so excellent in brightness that display blur such as coloring is suppressed even at an obliquely viewing direction. This is based on suppression of scattering in half-reflecting wavelength in respective positions in a surface relative to a half-reflecting average wavelength.

Features and advantages of the invention will be evident from the following detailed description of the preferred embodiments described in conjunction with the attached drawings.

DETAILED DESCRIPTION OF THE PREFERRED EMBODIMENTS

Figure 1:
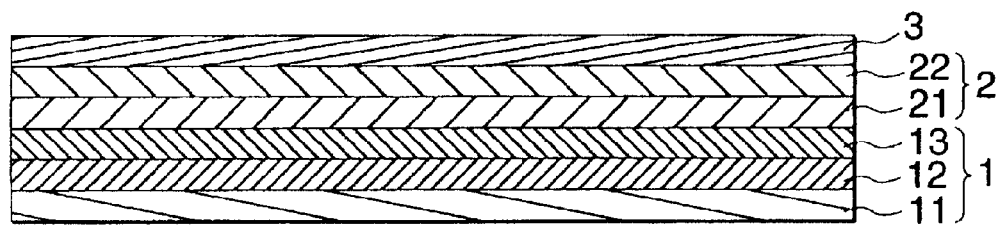
FIG. 1 shows a sectional view of an example of an optical element.

The polarizing element according to the present invention has a function of separating natural light into reflected or transmitted light composed of polarized light, wherein a half-reflecting wavelength in each position in a surface of the polarizing element ranges within ±10 nm relative to a half-reflecting average wavelength when the half-reflecting wavelength is a wavelength which is located at a long or short wave side of a wavelength exhibiting maximum reflectivity on the basis of a spectrum of reflected light in a predetermined wave range in which the natural light is separated into the reflected light and the transmitted light. And the half-reflecting wavelength exhibits reflectivity of 50% with respect to the maximum reflectivity. The half-reflecting average wavelength is an average of half-reflecting wavelengths in the whole surface of the polarizing element.

The polarizing element exhibiting a function of separating natural light into reflected or transmitted light parts of polarized light may be made of a suitable material. Incidentally, an example of the polarizing element is a circular polarized-light separating layer such as a cholesteric liquid-crystal oriented layer for separating natural light into left and right circularly polarized light parts through reflection and transmission.

Another example of the aforementioned polarizing element is an element capable of transmitting linearly polarized light with a predetermined axis of polarization and reflecting light other than the linearly polarized light, such as an element which is formed by laminating a large number of polymer layers of different photoelastic coefficient types, for example, from 10 to 1000 layers, and stretching the laminate so that refractive indices of the layers in a predetermined direction in a plane are made coincident with one another but refractive indices of the layers in a direction perpendicular to the predetermined direction are made different from one another.

The aforementioned cholesteric liquid crystal exhibits a circularly polarized light separating function having a wavelength characteristic which varies in accordance with the difference between helical pitches of Grandjean orientation. In the present invention, the circularly polarizing light separating layer may be of a suitable form type, such as a circularly polarizing light separating layer having its helical pitch varying in a direction of the thickness thereof, a circularly polarizing light separating layer constituted by a superposed body of two or more cholesteric liquid-crystal layers different in the central wavelength of reflected light, or a circularly polarizing light separating layer formed as a combination of the aforementioned two types of circularly polarizing light separating layers by superposing two or more cholesteric liquid-crystal layers different in helical pitch in order of length based on the central wavelength of reflected light to make the helical pitch vary in a direction of the thickness thereof.

The superposition of two cholesteric liquid-crystal layers or three or more cholesteric liquid-crystal layers different both in scattering in helical pitch in a direction of the thickness and in the central wavelength of reflected light, that is, different in helical pitch, aims at widening and elongating the wave range of the separating function, etc. That is, in a single cholesteric liquid-crystal layer oriented in a predetermined direction, the wave range exhibiting selective reflection property (dichroism for circularly polarized light) is generally limited. Although the limit may be a wide range covering an about 100 nm width, even the wave range cannot cover the whole range of visible light required for application to a liquid-crystal display device, or the like. Therefore, the superposition of cholesteric liquid-crystal layers aims at widening the range of scattering in helical pitch to thereby widen the wave range exhibiting dichroism for circularly polarized light, etc.

Incidentally, a circularly polarizing light separating layer which can cover the range of visible light can be formed efficiently by superposing several kinds of cholesteric liquid-crystal layers with the central wavelength of selective reflection in a range of from 300 to 900 nm and different in helical pitch in such a combination that light circularly polarized in one direction is reflected. Further, the superposition of a combination of cholesteric liquid-crystal layers reflecting light circularly polarized in one direction aims at arranging the phase states of circularly polarized light reflected by the respective layers to prevent different polarized states from occurring between the respective wave ranges to thereby increase the quantity of polarized light allowed to be used.

In the aforementioned circularly polarizing light separating layer, the superposition of cholesteric liquid-crystal layers in order of length based on the central wavelength of reflected light aims at suppressing the color change of transmitted light caused by the view angle change, etc. In this case, there may be allowed a stratified structure having two or more cholesteric liquid-crystal layers of the same helical pitch type, such as a form in which one cholesteric liquid-crystal layer different in helical pitch from cholesteric liquid-crystal layers of the same helical pitch type is interposed between the cholesteric liquid-crystal layers of the same helical pitch type or two or more cholesteric liquid-crystal layers different in helical pitch from cholesteric liquid-crystal layers of the same helical pitch type are interposed between the cholesteric liquid-crystal layers of the same helical pitch type in order of size of the central wavelength as described above.

A low molecular weight cholesteric liquid crystal, or the like, may be used for forming the circularly polarizing light separating layer. From the point of view of handling characteristic, thin-film characteristic, etc. of the resulting polarizing element, a cholesteric liquid-crystal polymer may be preferably used. In this case, the polarizing element can be obtained as a single layer body of a cholesteric liquid-crystal polymer film, or the like, or as a multilayer body of the cholesteric liquid-crystal polymer film supported by a plastic film, or the like. The polarizing element preferred from the point of view of enlargement, etc. of the view field angle for good visual recognition of the liquid-crystal display device, or the like, is made of a cholesteric liquid-crystal polymer which is Grandjean-oriented in a faultless state of its domain, or the like.

Incidentally, any suitably polymer may be used as the cholesteric liquid-crystal polymer without any particular limitation. Hence, various kinds of polymers such as a main chain type or side chain type polymer in which a conjugate linear atom group (mesogen) for donating liquid-crystal orientation is introduced into the main or side chain of the polymer, etc. may be used. The wave range for selective reflection becomes wider as the difference between indices of double refraction of the cholesteric liquid-crystal polymer increases. Accordingly, a cholesteric liquid-crystal polymer larger in the difference between indices of double refraction may be preferably used from the point of view of reduction of the number of layers, room for wavelength shifting at a large view field angle, etc. Incidentally, the liquid-crystal polymer preferred from the point of view of handling characteristic, stability of orientation at a practical temperature, etc. is a polymer having a glass transition temperature in a range of from 30 to 150° C.

Incidentally, an example of the main chain type liquid-crystal polymer is a polymer having a structure in which a mesogen group made of a para-substitutional cyclic compound, etc. is bonded through a spacer portion for donating flexibility as occasion demands. Specific examples of the polymer are polyester polymers, polyamide polymers, polycarbonate polymers, polyester-imide polymers, etc.

On the other hand, an example of the side chain type liquid-crystal polymer is a polymer which contains polyacrylate, polymethacrylate, polysiloxane, polymalonate, or the like, as a main chain frame, and a low-molecular liquid-crystal compound (mesogen portion) made of a para-substitutional cyclic compound, etc. as a side chain, through a spacer portion made of a conjugate atom group as occasion demands. Specific examples of the polymer are nematic liquid-crystal polymers containing low-molecular chiral agents, liquid-crystal polymers having chiral components introduced therein, mixed liquid-crystal polymers of nematic and cholesteric liquid-crystal polymers, and so on.

As described above, even the polymer having a para-substitutional cyclic compound for donating nematic orientation characteristic constituted by para-substitutional aromatic units, para-substitutional cyclohexyl cyclic units, etc. such as an azomethyne type, an azo type, an azoxy type, an ester type, a biphenyl type, a phenylcyclohexane type, or a bicyclohexane type, can be cholesterically oriented by a method of introducing a suitable chiral component made of an asymmetric carbon-containing compound or the like, a low-molecular chiral agent, or the like (Japanese Patent Publication No. Sho. 55-21479, U.S. Pat. No. 5,332,522, and so on). Incidentally, the terminal substitutional group in a para position in the para-substitutional cyclic compound may be a suitable group such as a cyano group, an alkyl group, an alkoxy group, etc.

Further, examples of the spacer portion are a polymethylene chain —$(CH_2)_n$—, a polyoxymethylene chain —$(CH_2CH_2O)_m$—, etc. exhibiting flexibility. The number of times of repetition of structural units forming the spacer portion is determined suitably on the basis of the chemical structure, etc. of the mesogen portion. In the case of a polymethylene chain, the number n is generally in a range of from 0 to 20, especially in a range of from 2 to 12. In the case of a polyoxymethylene chain, the number m is generally in a range of from 0 to 10, especially in a range of from 1 to 3.

The formation of the circularly polarizing light separating layer of the cholesteric liquid-crystal polymer can be performed by a method according to the background-art low-molecular liquid-crystal orientation process. Incidentally, an example of the method is a method comprising the steps of: spreading a liquid-crystal polymer on a suitable oriented film such as an oriented film prepared by forming a film of polyimide, polyvinyl alcohol, polyester, polyallylate, polyamide-imide, polyether-imide, or the like, on a support base material and rubbing the film with a rayon fabric, or the like, an obliquely vapor deposited layer of $SiO_2$, an oriented film subjected to a stretching process, or the like; heating the liquid-crystal polymer at a temperature not lower than the glass transition temperature but lower than the isotropic phase transition temperature; and cooling the liquid-crystal polymer to a temperature lower than the glass transition temperature in a Grandjean-oriented state of molecules of the liquid-crystal polymer to thereby make the liquid-crystal polymer in a glass state to thereby form a solidified layer having the orientation fixed.

A suitable material such as a single or laminated layer or a stretched film of plastics such as triacetyl cellulose, polyvinyl alcohol, polyimide, polallylate, polyester, polycarbonate, polysulfone, polyether-sulfone, amorphous polyolefin, denatured acrylic polymer, or epoxy resin, a glass plate, or the like, may be used as the aforementioned support base material. A plastic film is preferred from the point of view of reduction of thickness, etc.

The spreading of the liquid-crystal polymer can be performed, for example, by a method comprising the steps of: spreading a solution of the liquid-crystal polymer dissolved in a solvent into a thin layer by a suitably method such as a spin coating method, a roll coating method, a flow coating method, a printing method, a dip coating method, a cast coating method, or the like; and drying the thin layer as occasion demands. Especially, a method such as a spin coating method, or the like, is preferred because a film excellent in uniformity of thickness can be formed. Incidentally, a suitable solvent such as methylene chloride, cyclohexanone, trichloroethylene, tetrachloroethane, N-methylpyrolidone, tetrahydrofuran, or the like, may be used as the foregoing solvent.

The heating process for orienting the spread layer of the liquid-crystal polymer can be performed by heating the liquid-crystal polymer in a temperature range of from the glass transition temperature to the isotropic phase transition temperature of the liquid-crystal polymer as described above, that is, in a temperature range in which the liquid-crystal polymer exhibits a liquid-crystal phase. Further, the fixation of the oriented state can be performed by cooling the liquid-crystal polymer layer to a lower temperature than the glass transition temperature. The condition for cooling is not particularly limited. Since the aforementioned heating process can be generally performed at a temperature not higher than 300° C., a naturally cooling method is generally employed. Incidentally, various additives such as a stabilizer, a plasticizer, metals, etc., can be mixed with the spread solution of the cholesteric liquid-crystal polymer as occasion demands.

The preferred thickness of the liquid-crystal polymer solidified layer formed on the support base material is in a range of from 0.5 to 50 $\mu$m, especially in a range of from 1 to 30 $\mu$m, particularly in a range of from 2 to 10 $\mu$m, from the point of view of prevention of both orientation disorder and lowering of transmissivity, width of the wave range for selection reflection, etc. The liquid-crystal polymer solidified layer on the support base material may be integrated with the support base material or may be used as a film, or the like, separated from the support base material. Incidentally, in the case of using the support base material, the preferred total thickness of the layer inclusive of the base material is in a range of from 2 to 500 $\mu$m, especially in a range of from 5 to 300 $\mu$m, particularly in a range of from 10 to 200 $\mu$m.

Incidentally, the production of the circularly polarizing light separating layer with its helical pitch varying in a direction of the thickness thereof can be performed, for example, by an operation of sticking a predetermined number, two or three or more, of oriented cholesteric liquid-crystal polymer layers to one another by hot pressing. A suitable method such as a method of heating the cholesteric liquid-crystal polymer layers to a temperature not lower than the glass transition temperature but lower than the isotropic phase transition temperature through suitable hot pressing means such as a roll laminator to thereby contact-bond the cholesteric liquid-crystal polymer layers to one another can be employed for the hot pressing process. In the case of liquid-crystal polymer solidified layers integrated with support base materials respectively, a circularly polarizing light separating layer with its helical pitch varying in a direction of the thickness thereof can be obtained by superposing the solidified layers in accordance with the above description so that the solidified layers come into contact closely with each other.

Incidentally, the circularly polarizing light separating layer having its helical pitch varying in a direction of the thickness thereof may exhibit a continuous wave range of reflected light or may exhibit a discontinuous wave range of reflected light. The circularly polarizing light separating layer which is preferable from the point of view of prevention of occurrence of color blur, etc. exhibits a continuous wave range of reflected light. For example, such a circularly polarizing light separating layer can be produced by a method in which a superposed body of cholesteric liquid-crystal polymer layers formed by the aforementioned hot pressing operation, or the like, is heated at a temperature not lower than the glass transition temperature but lower than the isotropic phase transition temperature to thereby form a mixed layer of cholesteric liquid-crystal polymers for forming upper and lower layers in a close contact interface therebetween.

In the above description, the cholesteric liquid-crystal polymer layer formed by mixing cholesteric liquid-crystal polymers of the upper and lower layers forms a circularly polarizing light separating layer with its helical pitch different from those of the upper and lower layers and varying multistageously in a direction of the thickness thereof. Generally, the helical pitch of the circularly polarizing light separating layer takes one of intermediate values between those of the cholesteric liquid-crystal polymer layers for forming the upper and lower layers, so that the circularly polarizing light separating layer together with the upper and lower layers forms a region exhibiting a continuous wave range of reflected light.

Accordingly, when cholesteric liquid-crystal polymer layers are used in combination so that the wave ranges of reflected light in the upper and lower layers do not overlap each other, that is, when cholesteric liquid-crystal polymer layers are used in combination so that a missing region due to discontinuity is present in a wave range of reflected light, the cholesteric liquid-crystal polymer layer formed by mixing the upper and lower layers compensates for the foregoing missing region so that the wave range of reflected light can be made continuous. Hence, for example, a circularly polarizing light separating layer capable of reflecting light even in a wave range of from 500 to 600 nm, which is a discontinuous reflected light wave range, can be obtained by use of two kinds of cholesteric liquid-crystal polymer layers exhibiting a reflected light wave range of not larger than 500 nm and a reflected light wave range of not smaller than 600 nm respectively. What is meant by this is that a circularly polarizing light separating layer exhibiting a wide-band reflection wave range can be formed by superposition of a smaller number of cholesteric liquid-crystal polymer layers.

The polarizing element to be used in the present invention is provided so that a half-reflecting wavelength in each position in a surface of the polarizing element ranges within ±10 nm, especially within ±9 nm, particularly within ±8 nm (scattering characteristic) relative to a half-reflecting average wavelength when the half-reflecting wavelength is a wavelength which is located at the long or short wave side of a wavelength exhibiting the maximum reflectivity on the basis of the spectrum in a predetermined wave range of light reflected by the polarizing element and which exhibits a reflectivity of 50% with respect to the maximum reflectivity, and the half-reflecting average wavelength is the average of half-reflecting wavelengths in the whole surface of the polarizing element.

The aforementioned predetermined wave range is determined suitably on the basis of the reflection property exhibited by the polarizing element used. Since a liquid-crystal display device, especially a color liquid-crystal display device, needs light covering the whole wave range of visible light, it is preferable that the aforementioned scattering characteristic is satisfied in a range including the whole wave range of visible light, such as a wave range of from 300 to 1000 nm.

Incidentally, in a layer with a combination of reflection wave ranges, such as the aforementioned circularly polarizing light separating layer formed by superposing two or more cholesteric liquid-crystal layers different in the central wavelength of reflected light, a spectral waveform having a plurality of peaks shaped like a chain of chevrons, or the like, may be often generated because the spectral waveform as a whole is generated by a combination of chevron-shaped or trapezoidal spectral waveforms based on the respective liquid-crystal layers.

According to the present invention, a wavelength exhibiting maximum reflectivity in the predetermined wave range is determined uniquely even in the case where there are a plurality of peaks as described above. On the other hand, when light with a plurality of half-reflecting wavelengths exists on the long or short wave side of the wavelength exhibiting the maximum reflectivity, the condition for the aforementioned scattering is judged upon all the half-reflecting wavelengths. The polarizing element satisfying the condition for the aforementioned scattering is used in the present invention.

In the case of a cholesteric liquid-crystal layer, the aforementioned scattering characteristic can be achieved by making the thickness of the layer as uniform as possible. In the case of a plurality of layers, the aforementioned scattering characteristic can be achieved by making the thickness of each layer as uniform as possible. In the case where a factor such as an ultraviolet absorber, or the like, which brings a pitch change in a thickwise direction, is contained, the aforementioned scattering characteristic can be achieved by improving both dispersibility of the factor and uniformity of the quantity of ultraviolet-light irradiation, etc. Particularly, in a cholesteric liquid-crystal layer, unevenness of thickness caused by unevenness of coating, etc. makes the aforementioned scattering so large as to be apt to cause display blur.

When the cholesteric liquid-crystal layer having its pitch varying in a direction of the thickness thereof is formed so that the pitch changes from a large value to a small value linearly viewed from the quarter-wavelength plate side, there is a tendency that the scattering on the long wave side has a large influence on display blur. When the cholesteric liquid-crystal layer is contrariwise formed so that the pitch changes from a small value to a large value linearly viewed from the quarter-wavelength plate side, there is a tendency that the scattering on the short wave side have a large influence on display blur.

On the other hand, the aforementioned scattering characteristic in the polarizing element capable of transmitting linearly polarized light with a predetermined axis of polarization but reflecting other than the linearly polarized light can be achieved by making both thickness and birefringent property of each constituent layer of the multilayer film as uniform as possible, etc. In such a multilayer film type polarizing element, the birefringent property difference particularly caused by unevenness of stretching makes the scattering so large as to be apt to cause display blur. Accordingly, it is preferable that the stretching process is performed while the temperature for stretching the laminated film is kept as constant as possible. Incidentally, in the multilayer film type polarizing element, there is a tendency that the scattering both on the long and short wave sides have a large influence on display blur.

The use of the polarizing element exhibiting the aforementioned scattering characteristic can improve the brightness of the liquid-crystal display device, or the like, stably and can suppress occurrence of display blur at an obliquely viewing angle. Further, lowering of frontal brightness can be suppressed when a prism array layer is disposed.

The polarizing element according to the present invention can be preferably used for forming the liquid-crystal display device, etc. as described above. In this case, the polarizing element having the aforementioned circularly polarizing light separating layer may be used with a quarter-wavelength plate attached to at least one surface of the polarizing element. Such a quarter-wavelength plate, which aims at linearly polarizing circularly polarized light transmitted through the circularly polarizing light separating layer, may be disposed on either front or rear surface of the circularly polarizing light separating layer even in the case where there is a difference in the central wavelength of reflected light between the front and rear surfaces.

The quarter-wavelength plate may be formed by using one phase difference layer or of two or more phase difference layers. In the case of a visible light range, a quarter-wavelength plate with a frontal phase difference in a range of from 100 to 180 nm is preferably used from the point of view of the linearly polarizing effect, compensation for the color change caused by obliquely transmitted light, etc. That is, the quarter-wavelength plate preferably used satisfies the formula: $(nx-ny)d=\Delta nd=$ from 100 to 180 nm when nx represents the maximum refractive index in a surface of the quarter-wavelength plate, ny represents the refractive index in a direction perpendicular to the surface, nz represents the refractive index in a direction of the thickness of the quarter-wavelength plate, and d represents the thickness of the quarter-wavelength plate.

A phase difference layer, which may be used, as occasion demands, together with the phase difference layer exhibiting the function of the aforementioned quarter-wavelength plate, is provided for compensation's sake so that the color balance of light obliquely transmitted through the phase difference layer exhibiting the quarter-wavelength plate function is made more sufficiently coincident with the color balance of light perpendicularly transmitted through the phase difference layer, so that intermediate colors, which are less colored, can be visually recognized through the absorption polarizing plate. A phase difference layer with a frontal phase difference ($\Delta nd$) in a range of from 100 to 720 nm is preferably used.

Incidentally, in the above description, the aforementioned phase difference layer which can be preferably used from the point of view of compensation for the color change, etc. is a layer which has a larger refractive index in a direction of the thickness than that in one direction or those in both directions in the surface or a layer in which Nz expressed by the formula: $(nx-nz)(nx-ny)$ is not larger than 5, preferably not larger than 2, more preferably not larger than 1.5, further preferably not larger than 1.1 (each permitting minus values).

The phase difference layer can be formed of any material at option. A material excellent in transparency and especially exhibiting light transmissivity of not lower than 80% to donate a uniform phase difference is preferred. Examples of the material to be used generally are stretched films and liquid-crystal polymers made of plastics, such as polycarbonate, polyester, polysulfone, polyether-sulfone, polystyrene, polyolefins such as polyethylene and polypropylene, polyvinyl alcohol, cellulose acetate polymer, polyvinyl chloride, polyvinylidene chloride, polyallylate, polymethyl methacrylate, polyamide, etc. Especially, liquid-crystal polymers oriented twistedly are used preferably.

The aforementioned phase difference layer having a large refractive index in a direction of the thickness thereof can be formed by a suitable method such as a method in which a film formed of the aforementioned polymer, or the like, by a suitable method such as a casting method, an extrusion method, or the like, is stretched or shrunken under heating by a uniaxial or biaxial method, for example, while the film is bonded to a heat-shrinkable film.

The aforementioned characteristic such as $\Delta nd$, Nz, etc. of the phase difference layer can be controlled by changing the condition for the material and thickness of the film, the magnification of stretch (shrinkage), the temperature for stretch (shrinkage), etc. The general thickness of the phase difference layer is in a range of from 10 to 500 $\mu$m, especially in a range of from 20 to 200 $\mu$m in terms of a single layer. The thickness is not limited thereto.

Incidentally, when a phase difference layer such as a quarter-wavelength plate is formed of a liquid-crystal polymer, the phase difference plate can be obtained as a plate having a suitable form such as an oriented film of the liquid-crystal polymer, an oriented layer of the liquid-crystal polymer supported by a transparent base material, or the like, on the basis of the case of the aforementioned circularly polarizing light separating layer. In the casing of using a liquid-crystal polymer, an aimed phase difference layer can be formed without any stretching process.

The quarter-wavelength plate may be constituted by a single phase difference layer as described above or may be constituted by a superposed body of two phase difference layers or of three or more phase difference layers different in phase difference. The superposition of such phase difference layers different in phase difference is effective for enlargement of the wave range permitting the function of the quarter-wavelength plate or the compensating plate as an object, etc. When a superposed body of phase difference layers is used, it is preferable from the aforementioned point of view to dispose at least one phase difference layer having a refractive index which is higher in a thickwise direction than at least one of refractive indices nx and ny in the surface.

The polarizing element according to the present invention can be put into practical use in the form of an optical element made of a laminate of the polarizing element and an absorption type polarizing plate. FIG. 1 shows an example of the optical element. The reference numeral 1 designates a polarizing element (circularly polarizing light separating layer); and 3, an absorption type polarizing plate. Incidentally, in FIG. 1, a quarter-wavelength plate 2 made of a superposed body of phase difference plates 21 and 22 is disposed between the polarizing element 1 and the absorption type polarizing plate 3 because the polarizing element 1 is constituted by a circularly polarizing light separating layer made of a superposed body of cholesteric liquid-crystal layers 12 and 13. Incidentally, the reference numeral 11 designates a base material for supporting the circularly polarizing light separating layer 12, 13.

A suitable material such as a polarizing film or polyene oriented film impregnated with a dichromatic material, or the film coated with a transparent protective layer, may be used as the absorption type polarizing plate. Incidentally, an example of the polarizing film is a film formed by adsorbing a dichromatic material such as iodine, a dichromatic dye, or the like, onto a hydrophilic high-molecular film such as a polyvinyl alcohol film, a partially formalized polyvinyl alcohol film, or an ethylene-vinyl acetate copolymer partially saponified film and by stretching the hydrophilic high-molecular film. Examples of the polyene oriented film are dehydrates of polyvinyl alcohols, dehydrochlorinates of polyvinyl chlorides, etc.

For the formation of the liquid-crystal display device, a polarizing plate with a high degree of polarization such as a polarizing plate containing a dichromatic material is preferably used, from the point of view of achievement of a brilliant display, that is, achievement of display of a good contrast ratio due to incidence of highly linearly polarized light to liquid-crystal cells by transmitting highly linearly polarized light through the absorption type polarizing plate while preventing absorption loss as sufficiently as possible, etc. Especially, a polarizing plate containing a dichromatic material and having light transmissivity of not lower than 40% and a degree of polarization of not lower than 95.0%, particularly not lower than 99%, is preferably used.

Incidentally, the aforementioned transparent protective layer is provided for the purpose of protection particularly when the absorption type polarizing plate is as poor in water resistance as a polarizing film containing a dichromatic material. The transparent protective layer can be formed by a suitable method such as a method of applying plastics, or a method of laminating film-like materials. When the transparent protective layer is formed from separate materials such as films, it is preferable from the point of view of prevention of reflection loss, etc. that the separate materials are laminated so as to be integrated with one another through adhesive layers.

The thickness of the transparent protective layer may be determined suitably. The thickness is selected to be generally not larger than 1 mm, especially not larger than 500 μm, particularly in a range of from 1 to 300 μm. Incidentally, a suitable material may be used as the plastics. Generally, any one of materials exemplified above in the description of the liquid-crystal polymer-supporting transparent base material, the phase difference layer, etc. may be used as the plastics.

Incidentally, the transparent resin layer can be formed into the form of a surface fine roughness structure by a method of impregnating the transparent resin layer with fine particles, or the like. Suitable transparent fine particles, for example, with a mean particle size in a range of from 0.5 to 50 μm may be used as the fine particles. Examples of the fine particles are inorganic fine particles of silica, alumina, titania, zirconia, tin oxide, indium oxide, cadmium oxide, antimony oxide, etc. which may be electrically conductive, and organic fine particles of crosslinked or non-crosslinked polymers, etc. The fine particles content is generally in a rage of from 2 to 25% by weight, especially in a range of from 5 to 20% by weight.

For arrangement of the absorption type polarizing plate 3 on the upper side of the quarter-wavelength plate 2 as shown in the drawings, the angle of arrangement of the polarizing plate with respect to the quarter-wavelength plate may be determined suitably in accordance with the phase difference characteristic of the quarter-wavelength plate, the characteristic of circularly polarized light incident thereon, etc. From the point of view of improvement of light utilizing efficiency, etc., the absorption type polarizing plate 3 is preferably disposed so that the transmission axis of the absorption type polarizing plate is as parallel with the direction of polarization of light linearly polarized through the quarter-wavelength plate as possible.

The optical element according to the present invention is provided so that light such as natural light from a light source is separated into left and right circularly polarized light parts, left and right linearly polarized light parts, or the like, as light reflected or transmitted through a polarizing element, and that the circularly, elliptically or linearly polarized light transmitted or reflected through the polarizing element is linearly polarized through a quarter-wavelength plate as occasion demands to supply the thus obtained linearly polarized light to the absorption type polarizing plate, or the like.

Figure 2:
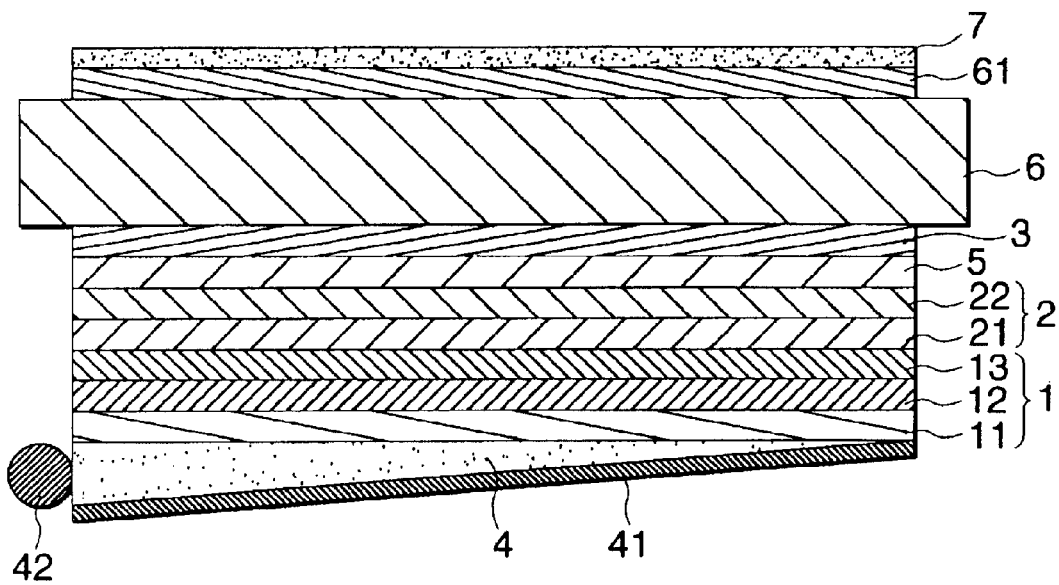
FIG. 2 shows a sectional view of an example of a liquid-crystal display device.

Accordingly, as shown in FIG. 2, a polarized light supply unit adapted to a back light of a liquid-crystal display device, or the like, can be formed by disposing the aforementioned polarizing element or optical element on a suitable surface light source 4 such as a side light type light pipe or an EL lamp. Incidentally, the surface light source shown in FIG. 2 has a light pipe 4, and a light source 42 disposed on a side surface of the light pipe 4. Incidentally, FIG. 2 shows an example of a liquid-crystal display device formed by use of such a polarized light supply unit.

According to the polarized light supply unit shown in FIG. 2, light from the light source 42 is incident to the side surface of the light pipe 4, reflected by a rear surface, etc. of the light pipe and output from a front surface of the light pipe. The output light is transmitted as specific circularly polarized light (perpendicular) or as specific elliptically polarized light (oblique) through a circularly polarizing light separating layer 1 (polarizing element) disposed on the front surface side of the light pipe. The transmitted light is linearly polarized through a quarter-wavelength plate 2. The linearly polarized light is incident to an absorption type polarizing plate 3. On the other hand, light reflected as nonspecific circularly polarized light on the circularly polarizing light separating layer 1 is incident to the light pipe again and reflected through the reflection layer 41 disposed on the rear surface, etc. of the light pipe. The reflected light is incident as return light to the circularly polarizing light separating layer 1 again.

The state of polarization of the aforementioned light reflected on the circularly polarizing light separating layer is changed when the light is reflected on the rear surface of the light pipe, so that part or all of the reflected light is transformed into specific circularly polarized light which can be transmitted through the circularly polarizing light separating layer. Accordingly, the light reflected on the circularly polarizing light separating layer is confined in between the circularly polarizing light separating layer and the light pipe while reflection is repeated therebetween until the reflected light is transformed into specific circularly polarized light.

In the side light type light pipe as described above, reflected light is confined in between the circularly polarizing light separating layer and the light pipe while reflection is repeated therebetween. In course of time, the state of polarization is changed to a state permitting the light to be transmitted through the circularly polarizing light separating layer. As a result, the light is output together with initially transmitted light of incident light. In this manner, unused part of light due to reflection loss is reduced.

On the other hand, light output from the circularly polarizing light separating layer is transformed into linearly polarized light or elliptically polarized light containing a large amount of linearly polarized light component through the quarter-wavelength plate. The thus transformed light is little absorbed but transmitted through the absorption type polarizing plate when the direction of linear polarization of the light coincides with the transmission axis of the absorption type polarizing plate. In this manner, unused part of light due to absorption loss is reduced. As a result, light part unused as reflection loss or absorption loss in the background art can be utilized effectively to thereby make it possible to improve the light utilizing efficiency. Accordingly, a side light type light pipe can be preferably used as a surface light source.

Any suitable plate having a reflection layer on its rear surface to output light toward its front surface side can be used as the aforementioned light pipe. Preferably, as the light pipe, a plate capable of outputting light efficiently without any absorption is used. An example of the preferred light pipe is a known side light type back light which is provided in a liquid-crystal display device and in which a linear light source such as a (cold or hot) cathode tube or a light source such as a light-emitting diode is disposed on a side surface of the light pipe 4 so that light transmitted through the light pipe is incident on a single surface side of the light pipe by diffusion, reflection, diffraction, interference, etc.

In the above description, the light pipe designed so that light transmitted in the inside thereof is incident on a single surface side can be obtained. In such a light pipe, for example, a diffusing member is provided in the form of dots or stripes on a light output surface of a transparent or semitransparent resin plate or on a rear surface thereof, or an uneven structure, especially a fine prism array-like uneven structure is given to a light output surface of such a resin plate or to a rear surface thereof.

Although the light pipe outputs light through one surface side, the light pipe itself may have a function of transforming polarization of light reflected by the polarizing element. When the reflection layer 41 is further provided on the rear surface of the light pipe, reflection loss can be approximately perfectly prevented. The reflection layer such as a diffuse reflection layer or a mirror reflection layer is excellent in the function of transforming polarization of light reflected on the polarizing element and can be preferably used in the present invention.

Incidentally, the diffuse reflection layer represented by an uneven surface, or the like, randomizes the state of polarization by its diffusing function to eliminate the state of polarization. The mirror reflection layer is represented by a layer on which aluminum, silver or the like is vapor deposited, a resin plate provided with such a vapor deposited layer, and a metal surface of metal foil. Thus, the mirror reflection layer inverts the state of polarization when polarized light is reflected by the mirror reflection layer.

For the formation of the polarized light supply unit, as shown in FIG. 2, a prism array layer 5 made of a prism sheet, or the like, for controlling the outgoing direction of light, a diffusing plate for obtaining uniform light emission, reflection means for returning leakage light or auxiliary means such as a light source holder for leading outgoing light from a linear light source to a side surface of the light pipe may be disposed as one layer or as a suitable combination of two or more layers in a predetermined position such as an upper, lower or side surface of the light pipe 4 as occasion demands.

In the above description, the prism array layer or the diffusing plate disposed on the front surface side (light output side) of the light pipe, dots given to the light pipe, etc. can function as polarization transforming means for changing the phase of reflected light by its diffusing effect, etc. Incidentally, when two or more prism array layers are disposed, the prism array layers are preferably disposed in an optical anisotropy eliminated state by differentiating the angles of arrangement of prism arrays in the respective layers from each other, for example, by means of making the prism arrays cross each other perpendicularly or obliquely.

According to the present invention, respective parts including a circularly polarizing light separating layer, a quarter-wavelength plate, an absorption type polarizing plate, a light pipe, etc. for forming a polarizing element, an optical element or a polarized light supply unit can be integrally laminated on one another through adhesive layers as occasion demands. The integral lamination of constituent parts is effective for prevention of lowering of display quality, etc. due to both suppression of reflection loss in each interface, and prevention of foreign matter, etc. from invading each interface; and for prevention of lowering of compensating efficiency, polarization transforming efficiency, etc. due to displacement of optical systems, and so on. Accordingly, also when the circularly polarizing light separating layer, the quarter-wavelength plate, the absorption type polarizing plate, the light pipe, or the like, is formed of a plurality of layers, the layers are preferably bonded to one another through adhesive layers or the like so as to be integrated with one another.

Any suitable adhesive, or the like, can be used for the aforementioned integral lamination. Especially, a tacky layer excellent in stress relaxing property may be preferably used from the point of view of suppressing stress produced in the polarizing element, the quarter-wavelength plate, the absorption type polarizing plate, or the like, by heat conducted from a light source, or the like, to thereby prevent the change of the refractive index caused by photoelastic deformation to thereby form a liquid-crystal display device brilliant and excellent in reliability of visual recognition and display quality.

A transparent adhesive formed by use of any suitable polymer such as acrylic polymer, silicone polymer, polyester, polyurethane, polyether or synthetic rubber may be used for forming the tacky layer. Especially, an acrylic adhesive may be preferably used from the point of view of optical transparency, tacky property, weather resistance, etc.

The thickness of the tacky layer may be determined suitably. Generally, the thickness is set to be in a range of from 1 to 500 μm, especially in a range of from 2 to 200 μm, particularly in a range of from 5 to 100 μm, from the point of view of adhesive force, reduction of thickness, etc. Incidentally, any suitable additive can be mixed with the tacky layer as occasion demands. Examples of the additive include: tackifiers such as petroleum resin, rosin resin, terpene resin, coumarone-indene resin, phenol resin, xylene resin and alkyd resin; a softener such as phthalic ester, phosphoric ester, paraffin chloride, polybutene and polyisobutylene; various kinds of fillers; age resistors; and so on.

The formation of the integrally laminated optical element, etc. can be achieved, for example, by a method in which: a tacky layer provided on a separator of a thin sheet such as a film, surface-treated with a releasant is transferred onto an adhesive surface of a polarizing element; a quarter-wavelength plate is contact-bonded onto the tacky layer as occasion demands; a tacky layer is further transferred onto the quarter-wavelength plate in the same manner as described above; an absorption type polarizing plate is disposed on the tacky layer; and the laminated parts are contact-bonded to one another.

Alternatively, the formation of the integrally laminated optical element, etc. may be achieved by any suitable method as follows. An example is a method in which: a tacky layer provided on a separator is transferred onto an adhesive surface of a light pipe, or the like; a polarizing element is disposed on the tacky layer so as to be contact-bonded thereto; and a quarter-wavelength plate and an absorption type polarizing plate are contact-bonded successively to the polarizing element through tacky layers transferred thereonto in the same manner as described above as occasion demands. Another example is a method in which: adherends such as a polarizing element, an absorption type polarizing plate, a light pipe, etc. are laminated on one another in a predetermined sequence through tacky layers provided on predetermined adhesive surfaces in advance; and the laminate is pressed so that the adherends are contact-bonded to one another collectively.

The polarizing element, the optical element or the polarized light supply unit according to the present invention may include any suitable optical layer such as a light diffusing plate disposed in a suitable position, for example, on a surface thereof or between layers. In this case, the optical layer may be integrally laminated on the polarizing element, etc. through a tacky layer, or the like, excellent in stress relaxing property. Such a pre-adhesion method has an advantage for production of an element stabler in quality and more excellent in reliability than the element produced by the method of successive adhesion in assembling line, etc.

Incidentally, parts such as a liquid-crystal layer, a quarter-wavelength plate, an absorption type polarizing plate, a light pipe, an adhesive layer, another optical layer, etc. for forming the polarizing element, the optical element or the polarized light supply unit according to the present invention may be formed to have ultraviolet absorbing ability, for example, by a method of treating the parts with an ultraviolet absorber such as a salicylic ester compound, a benzophenol compound, a benzotriazole compound, a cyanoacrylate compound or a nickel complex salt compound.

As described above, the polarizing element or optical element according to the present invention is combined with a suitable surface light source such as a side light type light pipe so that light polarized by the polarizing element is transformed in terms of polarization to be reused as output light as occasion demands to thereby prevent reflection loss. Moreover, the output light is phase-controlled through a quarter-wavelength plate as occasion demands so that the state of the output light is transformed into a state rich in linearly polarized light components capable of being transmitted through an absorption type polarizing plate to thereby prevent absorption loss due to the absorption type polarizing plate. As a result, improvement of brightness can be achieved.

Accordingly, the polarizing element or optical element according to the present invention can be preferably used in various devices as a back light system in a liquid-crystal display device, or the like, because the polarizing element or optical element is sufficiently excellent in light utilizing efficiency to provide light to be easily transmitted through an absorption type polarizing plate and is easy to increase the area thereof, etc. In this case, it is preferable from the point of view of use of output light as a light source that the output light contains 65% or more, especially 70% or more of a linearly polarized light component capable of being transmitted through an absorption type polarizing plate in the form of linearly polarized light or the major-axis component of elliptically polarized light.

FIG. 2 shows a liquid-crystal display device using the polarized light supply unit according to the present invention as a back light system. In the liquid-crystal display device, liquid-crystal cells 6 are disposed through an optical element on the light output surface side of the light pipe 4 forming the polarized light supply unit. The liquid-crystal cells 6 are disposed on the quarter-wavelength plate 2 side of the optical element as shown in FIG. 2. In FIG. 2, the reference numeral 61 designates an absorption type polarizing plate; and 7, a light diffusing plate for diffusing light for visual recognition.

The optical element or polarized light supply unit according to the present invention can be particularly preferably used for forming a liquid-crystal display device having absorption type polarizing plates disposed on both sides of liquid-crystal cells. Incidentally, when the optical element has an absorption type polarizing plate on the upper side of the quarter-wavelength plate, the absorption type polarizing plate on the optical element side of the liquid-crystal cells can be omitted.

Generally, the liquid-crystal display device is formed by suitably assembling constituent parts such as an absorption type polarizing plate, liquid-crystal cells, a back light, if necessary, a compensating phase difference plate, and by incorporating a driving circuit thereinto. According to the present invention, the liquid-crystal display device can be formed in accordance with the background art without particular limitation except that the polarizing element, the optical element or the polarized light supply unit is disposed on the back surface of the liquid-crystal cells on their visual recognition side as described above. It is, however, preferable that the constituent parts are integrally bonded to one another through tacky layers respectively.

Further, the polarizing element, the optical element or the polarized light supply unit according to the present invention can be preferably adapted to liquid-crystal cells requiring incidence of polarized light, such as cells using a twist nematic liquid crystal or cells using a supertwist nematic liquid crystal. It may be adapted also to liquid-crystal cells using a non-twist liquid crystal, a guest-host liquid crystal containing a dichromatic material dispersed therein, a ferroelectric liquid crystal, or the like.

When the liquid-crystal display device is formed, for example, suitable optical layers such as a light diffusing plate, an anti-glare layer, an anti-reflection film, a protective layer and a protective plate which are provided on the polarizing plate on the visual recognition side, or such as a compensating phase difference plate which is provided between the liquid-crystal cells and the polarizing plate on the visual recognition side may be disposed suitably. Incidentally, generally, an optical layer in which a plurality of polymer thin films are laminated (Japanese Patent Publication No. Hei. 4-268505 and PCT No. 95/17691) may be disposed between the back light and the liquid-crystal cells for the purpose of improvement of brightness, etc.

The aforementioned compensating phase difference plate compensates for wavelength's dependence on birefringence for the purpose of improvement of the visual recognition property, etc. According to the present invention, the compensating phase difference plate may be disposed between the absorption type polarizing plate on the visual recognition side and the liquid crystal cells or/and between the absorption type polarizing plate on the back light side and the liquid crystal cells as occasion demands. Incidentally, any suitable plate may be used as the compensating phase difference plate in accordance with the wave range, etc. The compensating phase difference plate may be formed as a single phase difference layer or as a multilayer of two or more phase difference layers. The compensating phase difference plate can be obtained as a stretched film, a liquid-crystal polymer layer, or the like, as described in the aforementioned quarter-wavelength plate.

EXAMPLE 1

A tetrahydrofuran solution containing 20% by weight of an acrylic thermotropic cholesteric liquid-crystal polymer with a selective reflection wave range A of from 400 to 470 nm was applied onto a polyvinyl alcohol-rubbed surface (about 0.1 μm thick) of a triacetyl cellulose film 50 μm thick by a spin coater. The film was heated at 160±2° C. for 2 minutes to be oriented. Then, the film was left at the room temperature to be cooled. Thus, a circularly polarized light separating layer 1.5±0.1 μm thick and capable of transmitting left circularly polarized light was formed.

Then, circularly polarizing light separating layers capable of transmitting left circularly polarized light with a selective reflection wave range B of from 500 to 580 nm, with a selective reflection wave range C of from 600 to 690 nm and with a selective reflection wave range D of from 700 to 800 nm, respectively, were laminated on the aforementioned circularly polarizing light separating layer A successively in the aforementioned manner except that the respective layers B, C and D were prepared by changing the ratio of two kinds of mesogens. Thus, an element made of a laminate of the circularly polarizing light separating layers A, B, C and D in alphabetical order and exhibiting dichroism for circularly polarized light was produced. A quarter-wavelength plate made of a stretched film of polycarbonate and having a frontal phase difference of 130 nm and an Nz value of 0.5 was bonded onto a surface of the circularly polarizing light separating layer D (larger helical pitch side) through an acrylic tacky layer 20 μm thick. Thus, a polarizing element was produced.

EXAMPLE 2

A polarizing element was produced similarly to Example 1 except that circularly polarizing light separating layers prepared by changing only the ratio of two kinds of mesogens and capable of transmitting left circularly polarized light with a selective reflection wave range E of from 800 to 910 nm, with a selective reflection wave range D of from 700 to 800 nm, with a selective reflection wave range C of from 600 to 690 nm, with a selective reflection wave range B of from 500 to 580 nm and with a selective reflection wave range A of from 400 to 470 nm, respectively, were laminated successively to thereby produce an element made of a laminate of the circularly polarizing light separating layers E, D, C, B and A in order and exhibiting dichroism for circularly polarized light, and that a quarter-wavelength plate made of a stretched film of polycarbonate and having a frontal phase difference of 130 nm and an Nz value of 2 was bonded onto a surface of the circularly polarizing light separating layer E (larger helical pitch side) of the element.

EXAMPLE 3

A hundred layers of polyester or denatured polyester films in a thickness range of from 2 to 10 μm were laminated alternately in order of thickness and thermally contact-bonded at 190° C. so as to be integrated with one another. Then, such laminates were stretched to be 1.1 times, 1.2 times, 1.3 times and 1.4 times respectively at 170±1° C. The thus stretched laminates were laminated and bonded onto one another in order of stretching magnification through acrylic tacky layers 20 μm thick each. Thus, a polarizing element was produced.

Comparative Example 1

A polarizing element was produced in the same manner as in Example 1 except that the spin coater was replaced by a bar coater by which circularly polarizing light separating layers 1.5±0.5 μm thick each were formed, and that the thus formed circularly polarizing light separating layers were laminated on one another.

Comparative Example 2

A polarizing element was produced in the same manner as in Example 2 except that the spin coater was replaced by a bar coater by which circularly polarizing light separating layers 1.5±0.5 μm thick each were formed, and that the thus obtained circularly polarizing light separating layers were laminated on one another.

Comparative Example 3

A polarizing element was produced in the same manner as in Example 3 except that the laminates were stretched to be 1.05 times, 1.10 times, 1.15 times and 1.20 times at 130±5° C., and that the thus formed resulting stretched laminates were used.

Evaluation Test

Half-Reflecting Wavelength

Reflectivity in each of the polarizing elements produced in Examples and Comparative Examples was measured in a wave range of from 300 to 1000 nm by using a spectrophotometer (MCPD-2000). The average value of half-reflecting wavelengths at five points in a surface and deviations of the measurement value from the average value were examined on the basis of the maximum reflectivity measured.

Display Blur

Each of the polarizing elements produced in Examples and Comparative Examples was disposed on a side light type surface light source having: an acrylic light pipe having a thickness of 4 mm and having a dot-printed rear surface; a cold-cathode tube with a diameter of 3 mm disposed on a side surface of the light pipe; an aluminum vapor deposition film for surrounding the cold-cathode tube; and a reflection sheet of a foamed polyester film provided on the dot-printed rear surface of the light pipe. An absorption type polarizing plate (SEG1425DU, made by Nitto Denko Corp.) having an axial angle adjusted to exhibit the maximum brightness was disposed on the polarizing element. In the aforementioned condition, display blur (chromaticity) in an oblique viewing direction was evaluated by eye observation.

Results of the aforementioned evaluation were shown in he following Table.

| | Scattering in Half-Reflecting Wavelength | | |
| --- | --- | --- | --- |
| | Long Wave Side | Short Wave Side | Display Blur |
| Example 1 | 750 ± 3 nm | 410 ± 2 nm | Little |
| Example 2 | 850 ± 3 nm | 415 ± 4 nm | Little |
| Example 3 | 870 ± 5 nm | 400 ± 7 nm | Little |
| Comparative Example 1 | 755 ± 13 nm | 415 ± 15 nm | Remarkable |
| Comparative Example 2 | 845 ± 18 nm | 410 ± 14 nm | Remarkable |
| Comparative Example 3 | 880 ± 19 nm | 420 ± 22 nm | Remarkable |

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A polarizing element capable of separating natural light into reflected light and transmitted light composed of polarized light, wherein a half-reflecting wavelength in each position in a surface of said polarizing element ranges within ±10 nm relative to a half-reflecting average wavelength, and wherein (i) the half-reflecting wavelength is a wavelength which is located at a long or short wave side of a wavelength exhibiting maximum reflectivity based on a spectrum of reflected light in a predetermined wave range in which the natural light is separated into the reflected light and the transmitted light, and the half-reflecting wavelength exhibits reflectivity of 50% with respect to the maximum reflectivity, and (ii) the half-reflecting average wavelength is an average of half-reflecting wavelengths in a whole surface of said polarizing element, and wherein said polarizing element comprises one of (i) a cholesteric liquid-crystal layer and (ii) a combination of the cholesteric liquid-crystal layer and a quarter-wavelength plate, and said predetermined wave range is from 300 to 1000 nm.

2. A polarizing element capable of separating natural light into reflected light and transmitted light composed of polarized light,
wherein a half-reflecting wavelength in each position in a surface of said polarizing element ranges within ±10 nm relative to a half-reflecting average wavelength, and
wherein (i) the half-reflecting wavelength is a wavelength which is located at a long or short wave side of a wavelength exhibiting maximum reflectivity based on a spectrum of reflected light in a predetermined wave range in which the natural light is separated into the reflected light and the transmitted light, and the half-reflecting wavelength exhibits reflectivity of 50% with respect to the maximum reflectivity, and (ii) the half-reflecting average wavelength is an average of half-reflecting wavelengths in a whole surface of said polarizing element, and
wherein said polarizing element comprises an element which is capable of transmitting linearly polarized light with a predetermined axis of polarization while said element reflects light other than said linearly polarized light, wherein said predetermined wave range is from 300 to 1000 nm.

3. An optical element, wherein a polarizing element according to any one of claim 1 or 2, and an absorption type polarizing plate are laminated one on another through an adhesive layer.

4. A polarized light supply unit, wherein a polarizing element according to any one of claims 1 or 2 is disposed above a surface light source which is provided with a reflection layer.

5. A polarized light supply unit according to claim 4, wherein said polarized light supply unit has at least one prism array layer.

6. A polarized light supply unit according to claim 5, wherein said polarized light supply unit has at least tow prism array layers arranged so that the directions of arrays in upper and lower layers intersect each other.

7. A liquid-crystal display device wherein liquid-crystal cells are disposed on a light output side of a polarized light supply unit according to claim 4.

8. A polarized light supply unit according to any one of claims 1 or 2, wherein layers to be formed are wholly or partially bonded to each other through an adhesive layer.

9. A polarized light supply unit, wherein an optical element according to claim 3 is disposed above a surface light source which is provided with a reflection layer.

10. A polarized light supply unit according to claim 9, wherein said polarized light supply unit has at least one prism array layer.

11. A polarized light supply unit according to claim 10, wherein said polarized light supply unit has at least two prism array layers arranged so that the directions of arrays in upper and lower layers intersect each other.

12. A liquid-crystal display device wherein liquid-crystal cells are disposed on a light output side of a polarized light supply unit according to claim 9.

13. A optical element according to claim 3, wherein layers to be formed are wholly or partially bonded to each other through an adhesive layer.

14. A polarized light supply unit according to claim 4, wherein layers to be formed are wholly or partially bonded to each other through an adhesive layer.

15. A liquid-crystal display device according to claim 7, wherein layers to be formed are wholly or partially bonded to each other through an adhesive layer.

* * * * *

UNITED STATES PATENT AND TRADEMARK OFFICE
CERTIFICATE OF CORRECTION

PATENT NO. : 6,795,139 B1
DATED : September 21, 2004
INVENTOR(S) : Tadayuki Kameyama and Hironori Motomura It is certified that error appears in the above-identified patent and that said Letters Patent is hereby corrected as shown below:

Column 9,
Line 35, "(nx-nz)(nx-ny)" should read -- (nx-nz) / (nx-ny) --.

Signed and Sealed this

Tenth Day of January, 2006

JON W. DUDAS
*Director of the United States Patent and Trademark Office*